United States Patent
Seewald et al.

(10) Patent No.: US 11,316,736 B2
(45) Date of Patent: Apr. 26, 2022

(54) INTENT-BASED NETWORKING USING DEVICE ADMINISTRATIVE SHELL

(71) Applicant: Cisco Technology, Inc., San Jose, CA (US)

(72) Inventors: Maik Guenter Seewald, Nuremberg (DE); Robert Edgar Barton, Richmond (CA); Jerome Henry, Pittsboro, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/865,864

(22) Filed: May 4, 2020

(65) Prior Publication Data

US 2021/0344561 A1 Nov. 4, 2021

(51) Int. Cl.
*H04L 12/24* (2006.01)
*G05B 19/05* (2006.01)
(Continued)

(52) U.S. Cl.
CPC ......... *H04L 41/0816* (2013.01); *G05B 19/05* (2013.01); *H04L 41/0876* (2013.01);
(Continued)

(58) Field of Classification Search
CPC ............. H04L 41/0816; H04L 41/0813; H04L 41/0803; H04L 41/0876; H04L 41/5003;
(Continued)

(56) References Cited

U.S. PATENT DOCUMENTS 7,330,473 B1 2/2008 Baier et al.
10,181,978 B1 * 1/2019 Argenti .................. H04L 67/12
(Continued)

FOREIGN PATENT DOCUMENTS

CN 106331018 A 1/2017

OTHER PUBLICATIONS

Prinz et al., Dynamic Real-time Orchestration of I4.0 Components based on Time-Sensitive Networking, 2018, Elsevier B.V., pp. 910-915. https://www.sciencedirect.com/science/article/pii/S2212827118303329 (Year: 2018).*

(Continued)

*Primary Examiner* — Nam T Tran
(74) *Attorney, Agent, or Firm* — Edell, Shapiro & Finnan, LLC

(57) ABSTRACT

A network controller automatically adjusts a computer network based on the operational information of an industrial device. The network controller receives a notification from a network element in the computer network that the industrial device attached to the network element has an administrative shell. The administrative shell includes operational information describing the operation of the industrial device. The network controller retrieves the administrative shell from the industrial device. The network controller parses the operational information in the administrative shell to determine an intent for the industrial device, and adjusts the computer network based on the intent of the industrial device.

20 Claims, 6 Drawing Sheets

(51) Int. Cl.
　　*H04L 29/08*　　　　(2006.01)
　　*H04L 12/851*　　　(2013.01)
　　*H04L 41/0816*　　(2022.01)
　　*H04L 41/08*　　　　(2022.01)
　　*H04L 41/5003*　　(2022.01)
　　*H04L 41/5041*　　(2022.01)
　　*H04L 69/324*　　　(2022.01)
　　*H04L 47/2425*　　(2022.01)

(52) U.S. Cl.
　　CPC ...... *H04L 41/5003* (2013.01); *H04L 41/5041* (2013.01); *H04L 47/2425* (2013.01); *H04L 69/324* (2013.01); *G05B 2219/15012* (2013.01)

(58) Field of Classification Search
　　CPC ............. H04L 41/5041; H04L 47/2425; H04L 69/324; G05B 19/05; G05B 19/41845
　　See application file for complete search history.

(56) References Cited

U.S. PATENT DOCUMENTS

| | | | |
|---|---|---|---|
| 2017/0033984 A1* | 2/2017 | Lear | H04L 67/34 |
| 2017/0295071 A1 | 10/2017 | Yang et al. | |
| 2020/0358764 A1* | 11/2020 | Hojilla Uy | H04L 63/0823 |
| 2021/0029029 A1* | 1/2021 | Mehmedagic | H04L 63/0218 |

OTHER PUBLICATIONS

Wikipedia, Link Layer Discovery Protocol, Jan. 11, 2019, Wikipedia, all pages. https://en.wikipedia.org/w/index.php?title=Link_Layer_Discovery_Protocol&oldid=1002281940 (Year: 2019).*

Tarik Terzimehic, Andreas Bayha, and Kirill Dorofeev, "Function Blocks for the Interaction with the Asset Administration Shell", 2019, IEEE. (Year: 2019).*

Zdenek Bradac, Frantisek Zezulka, Petr Maroon, "Technical and Theoretical Basis of Industry 4.0 Implementation", 2018, Journal of the Technical University—Sofia. (Year: 2018).*

Shu Ing Tay et al., "An Overview of Industry 4.0: Definition, Components, and Government Initiatives", Journal of Advanced Research in Dynamical and Conlrol Systems, Dec. 2018, 10 pages.

Cisco, "Cisco DNA Center 1.3.3.0", Cisco Public, Feb. 2020, 26 pages.

Plattform Industrie 4.0, "Details of the Administration Shell", Plattform Industrie 4.0, 64 pages; retrieved from Internet Feb. 28, 2020.

* cited by examiner

INTENT-BASED NETWORKING USING DEVICE ADMINISTRATIVE SHELL

TECHNICAL FIELD

The present disclosure relates to automated configuration of software defined network access for industrial devices.

BACKGROUND

In industrial networks, engineering, initial configuration, and changes to configuration of devices are each typically manual processes. However, connectivity, parameterization (e.g., Quality of Service (QoS)), and security configuration are handled as separate processes, often maintained by a different group within an organization. Existing Software Defined Networking (SDN) and network visualization tools provide basic services for the integration of industrial networks. These basic services are static, and not automatically tuned based on requirements and workflows applicable to industrial devices. Existing solutions for applying SDN involve predefined network options (e.g., QoS, security policy, etc.) to apply to industrial devices, which are not associated with specific users.

DESCRIPTION OF EXAMPLE EMBODIMENTS

Overview

Figure 1:
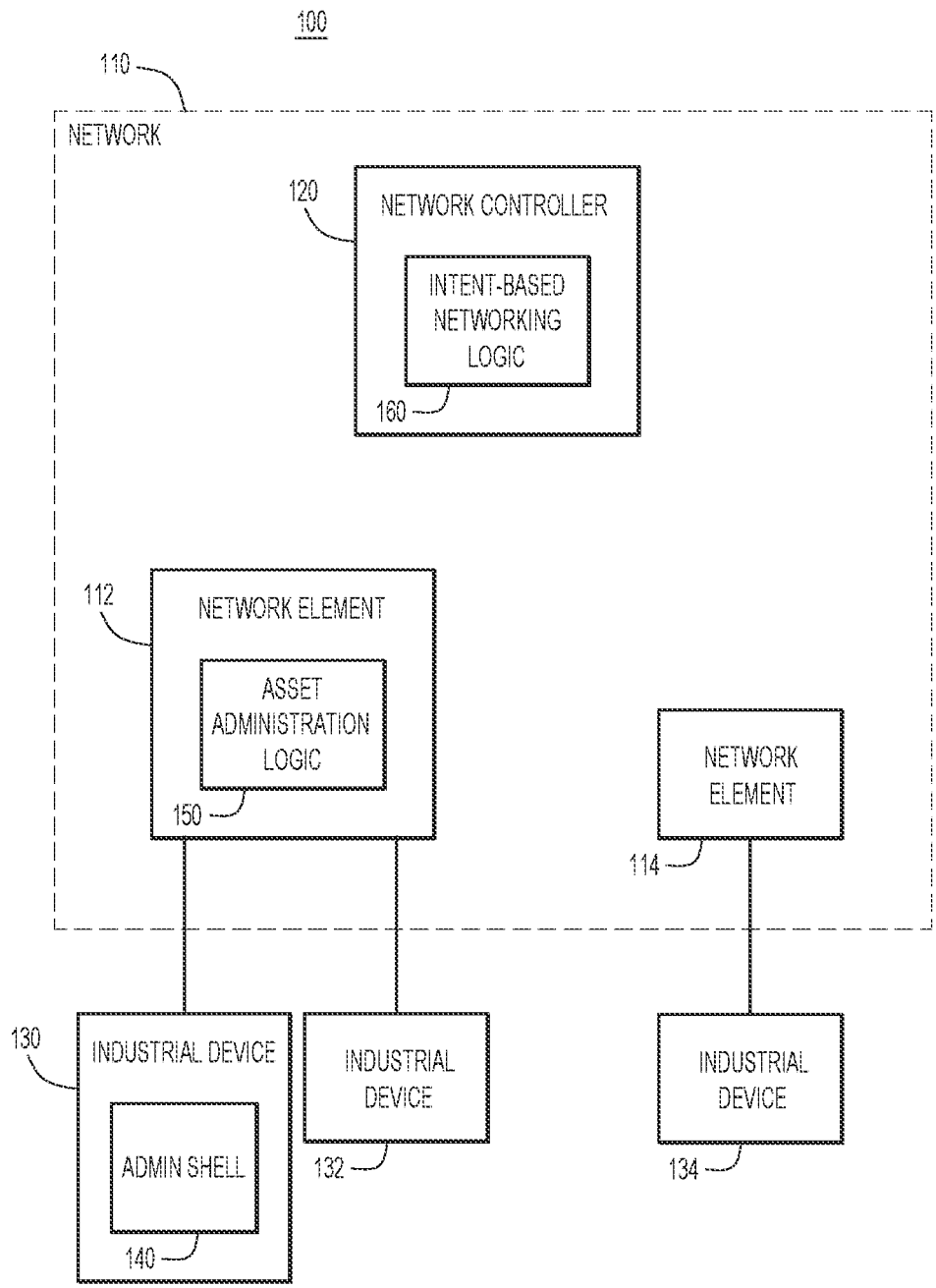
FIG. 1 is a simplified block diagram of an intent-based industrial network, according to an example embodiment.

A computer implemented method is provided for a network controller to automatically adjust a computer network based on operational information of an industrial device. The method includes receiving a notification from a network element in the computer network that the industrial device attached to the network element has an administrative shell. The administrative shell includes operational information describing the operation of the industrial device. The method also includes retrieving the administrative shell from the industrial device. The method further includes parsing the operational information in the administrative shell to determine an intent for the industrial device, and adjusting the computer network based on the intent of the industrial device.

Example Embodiments

Digitization initiatives, such as Industry 4.0, are developed to connect relevant industrial devices and software in a business process. This may involve Industrial Internet of Things (IIoT) automation devices, cyber-physical systems, as well as a variety of stakeholders, such as suppliers and customers. New use cases are being developed that reach higher levels of efficiency based on increasing network connectivity and automation of services and functions of connected devices.

Intent based networking and software defined networks may play a role in the newly developed use cases, but current solutions lack certain capabilities to make them applicable to Industry 4.0 and other Operational Technology (OT)-centric applications. For instance, intent of devices in an industrial network is different than determining intent in typical enterprise networking.

Within the Industry 4.0 framework, the Asset Administration Shell (AAS) allows a device to communicate its intent to the rest of the framework. The AAS is becoming a standard component of modern industrial automation elements. In other words, the AAS enables any industry component with networking capabilities to share information with other components and systems, including network elements.

The AAS provides controlled access to important information about an industrial device, such as an Input/Output (I/O) device or a Programmable Logic Controller (PLC). The AAS identifies the industrial device unambiguously, represents a standardized and secure communication interface, and integrates the industrial device into a logical system (e.g., the Industry 4.0 automation system). The properties and capabilities of the industrial device, as well as derived workflow and function definitions, may be part of the AAS, which allows a fully automated integration of the industrial device into an automation system.

In one example, a core part of the AAS includes the Manifest, which provides the information about the operational properties of the industrial device. The AAS Manifest may include any information relevant to meet workflow requirements. For instance, the AAS of an industrial device may include:
  Communication patterns (e.g., peers and devices with which the industrial device communicates, event-based behavior, etc.)
  Bandwidth requirements and performance/latency requirements
  Criticality (e.g., high availability leading to redundancy)
  Auxiliary services (e.g., precise time requirements)
  Required security (e.g., encryption, traffic separation, etc.)
  Workflow information Some SDN implementations provide interfaces to integrate devices/assets into the network, and deploy configurations and flow structures based on intents. Typically, SDN implementations provide for integrating end user devices or applications upon which QoS and/or security policies may be applied. As the Internet of Things (IoT) industry moves toward SDN architectures, intent-based management platforms may play a role in integrating industrial devices. However, typical intent-based management platforms rely on defined network intents to configure the SDN architecture. The techniques presented herein provide for automated conversion of data and system functions of industrial assets into network intents. In one example, the intent-based management platform described herein automatically leverages asset information in the AAS to determine the intent of industrial devices and configure the network access of the industrial device to satisfy the intent of the industrial device.

Referring now to FIG. 1, an automation system 100 is configured to automatically detect connected devices and automatically determine the intent of the industrial device in order to configure the network 110 to accommodate the intent. The network 110 includes network elements 112 and 114 configured to connect industrial devices to the network 110. The network 110 is managed by a network controller 120 that is configured to implement network settings that are compatible with the intents of the connected industrial devices. In one example, the network controller 120 may be an SDN controller that is configured to define the network connections between network elements (e.g., network elements 112 and 114).

The system 100 also includes industrial devices 130 and 132 that connect to the network 110 via the network element 112 and industrial device 134 that connects to the network 110 via the network element 114. In one example, the industrial devices 130, 132, and/or 134 may be relatively simple components that do not have typical user interfaces (e.g., keyboard, display screen, etc.) to allow a user to provision the device. The industrial device 130 includes an administrative (admin) shell (e.g., an AAS), which includes operational information identifying the industrial device 130. The industrial devices 132 and 134 may have similar administrative shells, which are not shown in FIG. 1.

The network element 112 includes asset administration logic 150 that enables the network element to detect that the industrial device 130 is attached to the network element 112. In one example, the asset administration logic 150 may support Link Layer Discover Protocol (LLDP) messages that are advertised from the industrial device 130. The network controller 120 includes intent-based networking logic 160 that enables the network controller 120 to retrieve the administrative shell 140 from the industrial device and determine the intent of the industrial device 130 from the contents of the administrative shell 140.

The integration of the network configuration based on the well-defined intent from the administrative shell 140 leads to a system 100 that is fully automated end-to-end. The system 100 interprets operational technology requirements, derives the information technology consequences of the operational requirements, and implements the information technology consequences.

In addition to implementing the intent-based networking changes for the industrial device 130, the network controller 120 may monitor the industrial device 130 to ensure that the performance of the industrial device 130 matches the intent of the industrial device 130. The network controller 120 is positioned and configured to monitor both security and operational performance of the industrial device 130 through the network 110. The network controller 120 may correlate network telemetry and the information in administrative shells to identify patterns as well as outliers when monitoring connected assets (e.g., industrial devices 130, 132, and 134) and their network behavior.

With access to administrative shells of connected assets, the network controller 120 may provide ongoing assurance of business operations. The network controller 120 may also have the capability to optimize industrial processes and the behavior of the system 100. Based on the operational information stored in the administrative shells and the correlation of data from multiple devices, the network controller 120 may readjust the network configuration to optimize specific automation solutions to improve efficiency, change management, monitor specific assets, and/or security behavior. This feedback loop integrates the administrative shell and network intent dynamically with the network configuration.

As described further hereinafter, the network controller 120 is configured to extract the intent of the industrial device 130 from the administrative shell 140. For instance, information related to network characteristics is extracted, including identification of peers (e.g., industrial device 132 or 134) with which the industrial device 130 will communicate, security policy, and/or bandwidth requirements. The administrative shell 140 may include additional information that is relevant to determining the intent of the industrial device 130, as well as information that may not be relevant to the network.

The administrative shell 140 provides intent of the industrial application of the industrial device 130, and the network controller 120 translates the intent into a specific network configuration to support the intent of the industrial device 130. As a specific example, the industrial device 130 (e.g., a sensor) may be configured to provide data to industrial device 134 (e.g., a Programmable Logic Controller). The administrative shell 140 may provide operational information that specifies/identifies the industrial device 134 as a peer device, the amount of data that the industrial device 130 will provide to the industrial device 134, and the criticality and tolerance to latency and loss of the data.

With that operational information retrieved from the administrative shell 140, the network controller 120 adapts the network 110 to the intent of the industrial device 130 (e.g., provide accurate sensor data to a specific device with acceptable latency and loss). The network controller 120 may adapt the network 110 by configuring a network conduit from the network element 112 to the network element 114 with sufficient bandwidth that allows the industrial device 130 to send data to the industrial device 134. To address the loss tolerance operational requirement, the network controller 120 may establish redundant paths between the network element 112 and the network element 114. Additionally, the network controller 120 may determine that the industrial device 130 uses precision time information to provide accurate sensor data, and provide a time reference (e.g., via a Precision Time Protocol (PTP) server) to the industrial device 130.

Figure 2:
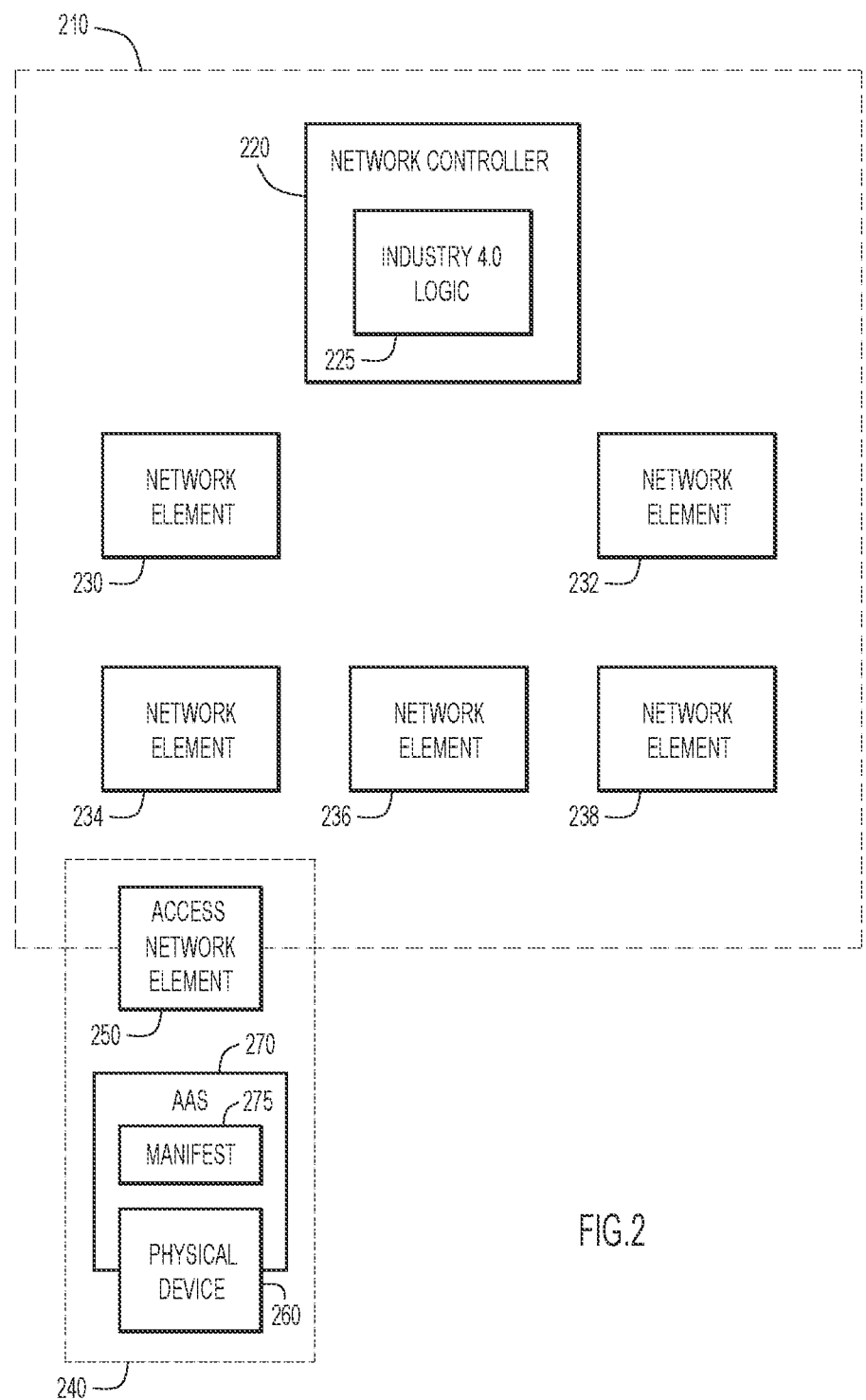
FIG. 2 illustrates an intent-based industrial network in an Industry 4.0 implementation, according to an example embodiment.

Referring now to FIG. 2, a simplified block diagram illustrates an automation system implemented according to an Industry 4.0 standard. A network 210 includes a network controller 220 with Industry 4.0 logic 225. The Industry 4.0 logic 225 is configured to allow the network controller 220 to interface with various components of an Industry 4.0 system. The network controller 220 interfaces with core network elements 230, 232, 234, 236, and 238 and shapes the data traffic within the network 210 to conform to any requirements of connected devices.

The network controller 220 also interfaces with at least one separate domain 240 through an access network element 250. The domain 240 includes a physical device 260 that is associated with an Asset Administration Shell (AAS) 270. The AAS 270 includes a manifest 275 that describes operational information about the associated physical device 260. In one example the operational information may include with which other devices the physical device 260 communicates, any network performance requirements, any security requirements, or other information relevant to the operation of the physical device 260.

In one example, the network controller 220 extracts the AAS 270 from the physical device 260. The network controller 220 may retrieve a portion of the AAS 270 or the manifest 275 that is relevant to network characteristics. Alternatively, the network controller may retrieve the entire AAS 270 or the entire manifest 275 including information that may not be directly related to the network configuration. The network controller 220 processes the operational information contained in the AAS 270 to learn the intent of the physical device 260. The network controller 220 configures the network 210 to enable the intent of the physical device 260.

Figure 3:
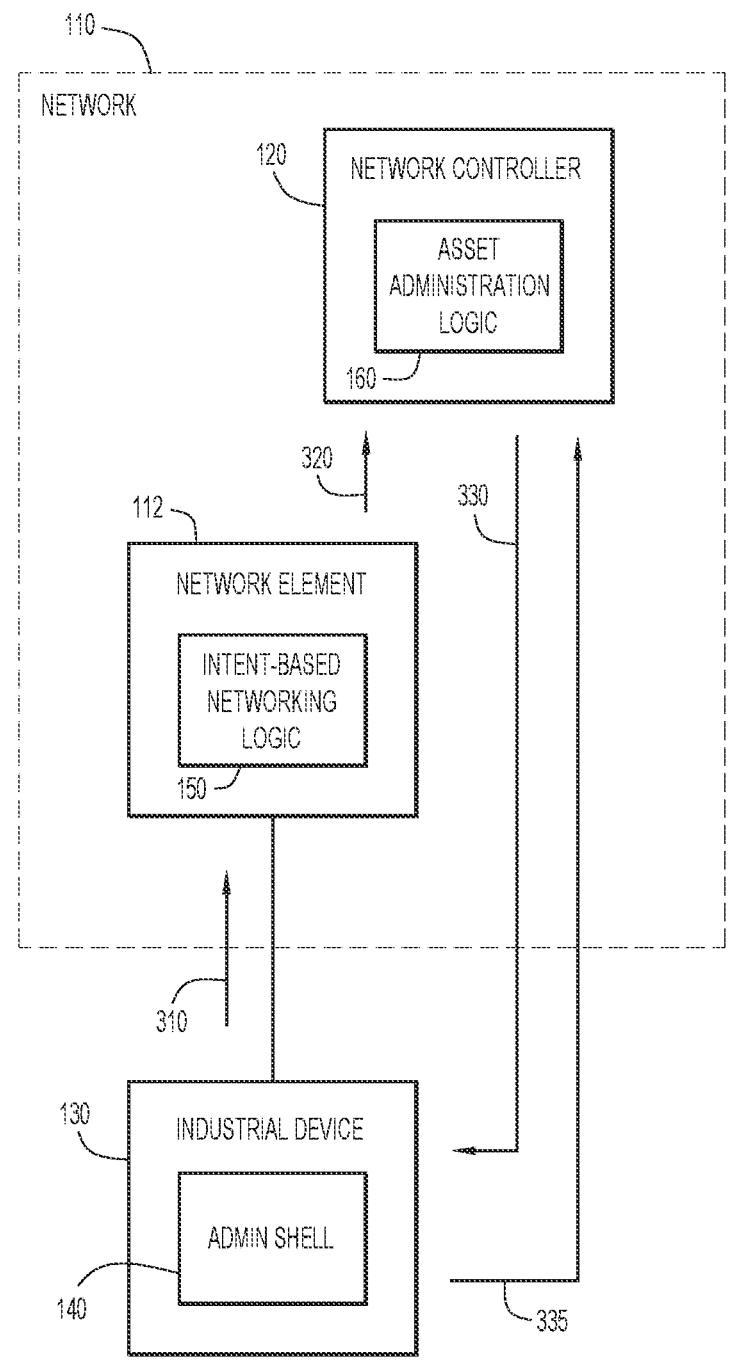
FIG. 3 is a simplified message block diagram illustrating the message flow for a network controller to automatically obtain operational information from a connected industrial device, according to an example embodiment.

Referring now to FIG. 3, a message flow is shown for the system described in FIG. 1 to depict learning of the intent of a newly connected industrial device 130 in order to adjust the configuration of the network 110 to enable the intent of the industrial device 130. When the industrial device 130 initially connects to the network 110 via the network element 112, the industrial device 130 sends a message 310 to the network element 112 to which it connects. The message 310 indicates that the industrial device 130 includes an administrative shell 140. The message 310 may include some of the information stored in the administrative shell 140. In one example, the message 310 is a LLDP frame that includes a Type/Length/Value (TLV) structure that identifies the administrative shell 140 of the industrial device 130. The message 310 may include additional TLV structures that encode some of the operational information stored in the administrative shell 140.

The network element 112 sends a notification 320 to the network controller 120 that identifies the industrial device 130 and indicates that the industrial device includes an administrative shell 140 with operational information associated with the industrial device 130. The network controller 120 sends a request 330 to the industrial device 130 to obtain the administrative shell 140. The industrial device 130 responds to the request 330 with some or all of the administrative shell 140 in a response 335.

Figure 4:
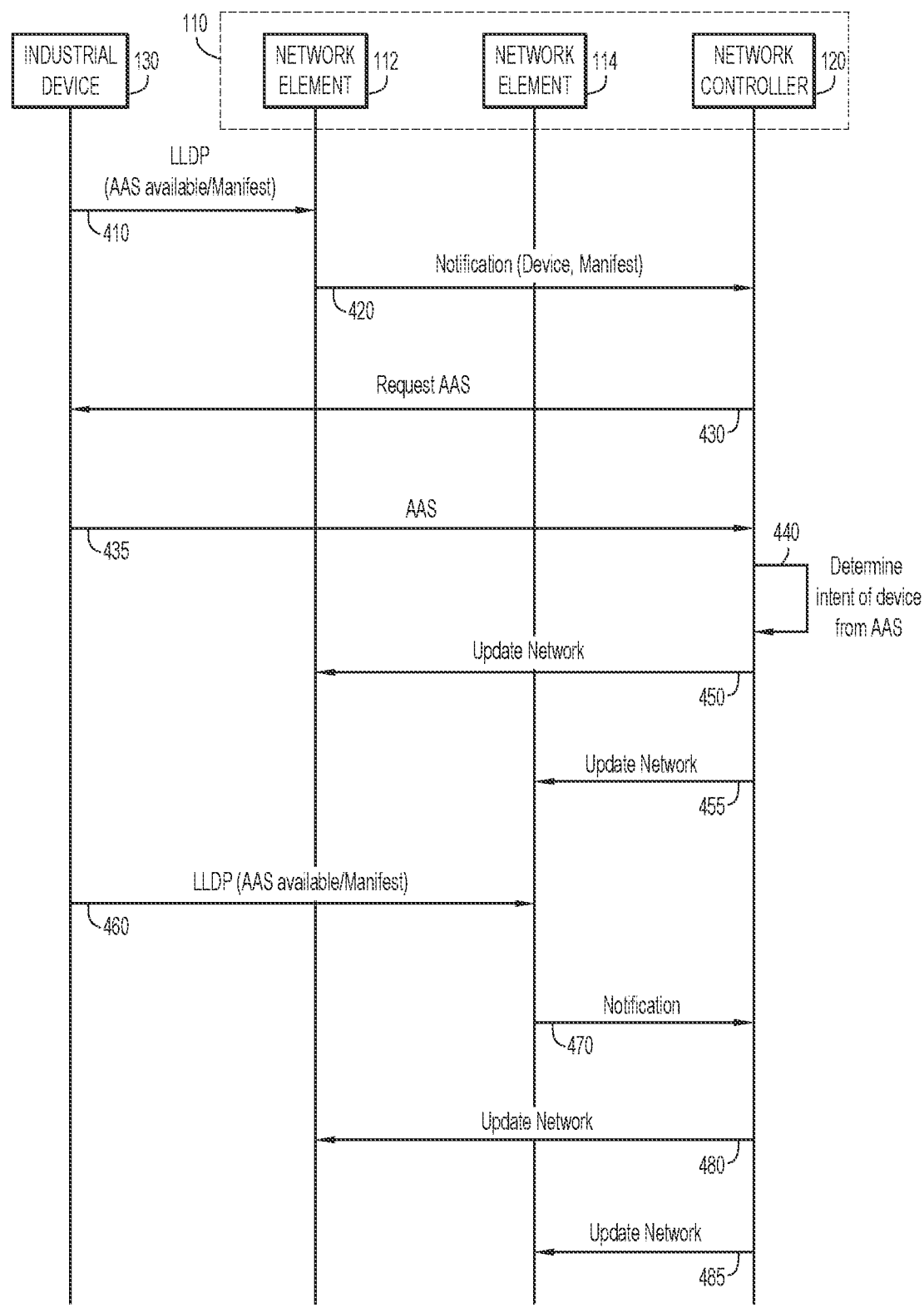
FIG. 4 is a simplified message flow diagram illustrating the message flow for an Industry 4.0 implementation, according to an example embodiment.

Referring now to FIG. 4, a message flow diagram is shown for one example implementation of network 110 adapting to service an industrial device 130. When the industrial device 130 attaches to the network element 112 in the network 110, the industrial device 130 sends an LLDP frame 410 to the network element 112. The LLDP frame 410 includes an indication that the industrial device 130 has an Asset Administration Shell (AAS) available at the industrial device 130. In one example, the LLDP frame 410 may also include at least a portion of the Manifest from the AAS of the industrial device 130. The industrial device 130 may periodically resend the LLDP frame 410 to maintain the link between the industrial device 130 and the network element 112.

After receiving the LLDP frame 410, the network element 112 sends a notification 420 to the network controller 120 of the network 110. The notification 420 identifies the device (i.e., industrial device 130) and there is an AAS available at the industrial device 130. Additionally, the notification 420 may include any portion of the Manifest from the AAS of the industrial device 130 that was included in the LLDP frame 410.

The network controller 120 sends a request 430 to the industrial device for the AAS of the industrial device 130. In this example, the network controller 120 is acting as a Component Manager, which is a defined component of an Industry 4.0 system. In response, the industrial device 130 provides the AAS, at 435, to the network controller 120.

At 440, the network controller 120 parses the AAS 435 to determine the intent of the industrial device 130. In one example, the network controller 120 filters out components of the AAS 435 that are not relevant for networking access (e.g., specifications for device disk access) and extracts the components that may be relevant (e.g., device type, bandwidth requirements, peer devices, specific protocols such as Device Level Ring (DLR), known subscribers to published data streams, etc.).

The network controller 120 translates the operational information in the AAS 435 into an intent for the industrial device 130. The network controller enables the intent of the industrial device 130 by adjusting the network 110 with specific network actions (e.g., secure conduits, bandwidth allocation, QoS/prioritization rules, Access Control Lists (ACLs), Virtual Local Area Networks (VxLANs) between relevant components, etc.). The network controller 120 sends network updates 450 and 455 to the network elements 112 and 114, respectively, to establish the specific network actions within the network 110 to support the industrial device 130.

At a later time, the industrial device 130 may be moved to connect to the network 110 via the network element 114 instead of via the network element 112. The industrial device 130 sends an LLDP frame 460 to the network element 114 indicating that an AAS is available for the industrial device 130. In one example, the LLDP frame 460 contains similar information as the LLDP frame 410. The network element 114 sends a notification 470 to the network controller 120 indicating that the industrial device 130 is connected to the network element 114 and has an associated AAS.

The notification 470 may include sufficient information to identify the industrial device 130, for which the network controller 120 has previously determined the intent. Alternatively, the network controller 120 may retrieve the AAS from the industrial device 130, and repeat the determination of the intent of the industrial device 130. The network controller 120 sends network updates 480 and 485 to the network elements 112 and 114, respectively, to update the network 110 and support the intent of the industrial device 130 connected to the network element 114.

In one example, the network controller 120 may adjust one or more network/security services based on the intent of the industrial device 130 determined from the associated AAS. A non-exhaustive list of services adjusted by the network controller may include: assigning QoS in the network based on device requirements and underlying business functions, applying Service Level Agreement (SLA) conditions/requirements based on business functions, automatically creating a zones and conduit architecture through network access control and segmentation, configuring ACL and firewall rules, monitoring of business-critical functions/intents, and/or other auxiliary services (E.g., providing precise time synchronization).

In a specific example, the intent determined from the AAS of the industrial device 130 may dictate that the industrial device may communicate with specific peer devices (e.g., a Programmable Logic Controller may only communicate with certain Input/Output devices and a Supervisory Control And Data Acquisition (SCADA) master). Based on this strict peer relationship, the network controller 120 may create a virtual network overlay or add the industrial device 130 to an existing overlay.

Figure 5:
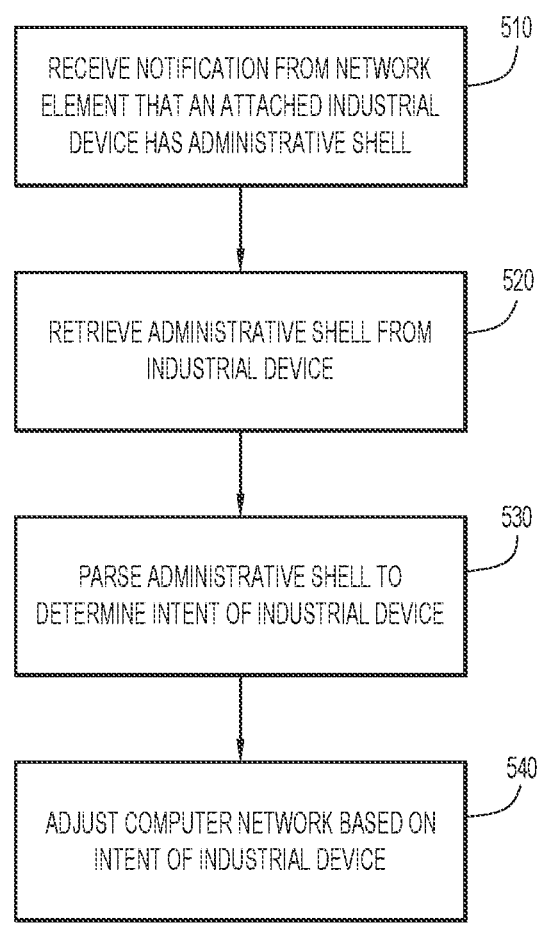
FIG. 5 is a flowchart illustrating operations of a network controller for automatically adjusting a network based on the intent of an industrial device, according to an example embodiment.

Referring now to FIG. 5, a flowchart illustrates operations performed at a network controller (e.g., network controller 120) in a process 500 for adapting a computer network based on the intent of a connected industrial device. At 510, the network controller of a computer network receives a notification from a network element in the computer network. The notification indicates that an industrial device attached to the network element has an administrative shell that includes operational information describing the operation of the industrial device. In one example, the notification indicates that the administrative shell is an Asset Administrative Shell formatted according to an Industry 4.0 standard.

At 520, the network controller retrieves the administrative shell from the industrial device. In one example, the network controller acts as a Component Manager for an Industry 4.0 system. At 530, the network controller parses the operational information in the administrative shell of the industrial device. The operational information enables the network controller to determine an intent for the industrial device. In one example, the operational information includes network performance requirements, peer connections, and/or security requirements.

At 540, the network controller adjusts the computer network based on the intent of the industrial device. In one example, the network controller may update ACLs or firewall settings, connect the industrial device to the appropriate VxLAN, and/or provision sufficient bandwidth to one or more network elements in order to enable the intent of the industrial device.

Figure 6:
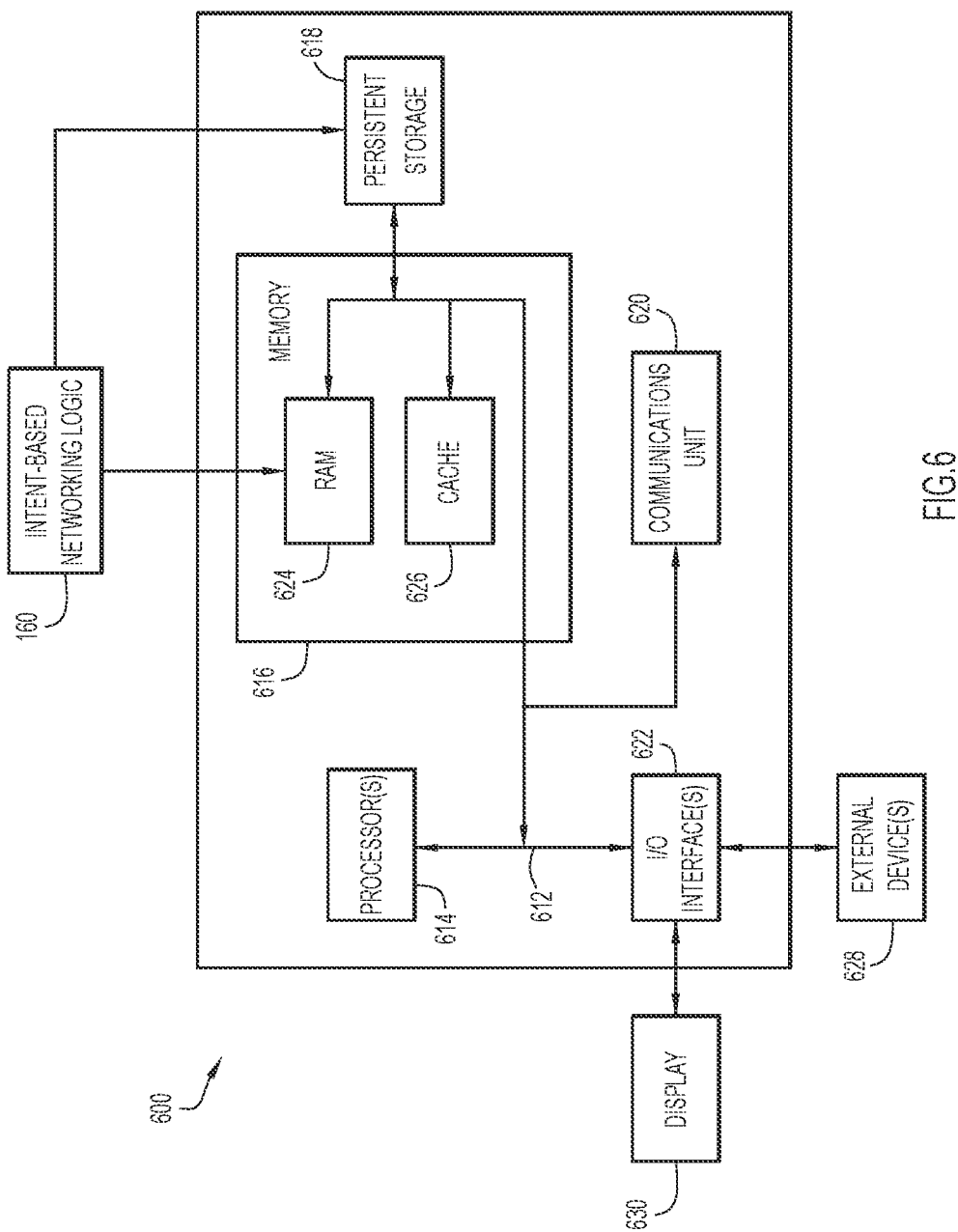
FIG. 6 illustrates a simplified block diagram of a device that may be configured to perform methods presented herein, according to an example embodiment.

Referring now to FIG. 6, a hardware block diagram illustrates a computing device 600 that may perform the functions of any of the servers or computing or control entities (e.g., network controller 120 or network element 112) referred to herein in connection with the intent-based automation system described herein. It should be appreciated that FIG. 6 provides only an illustration of one embodiment and does not imply any limitations with regard to the environments in which different embodiments may be implemented. Many modifications to the depicted environment may be made.

As depicted, the device 600 includes a bus 612, which provides communications between computer processor(s) 614, memory 616, persistent storage 618, communications unit 620, and input/output (I/O) interface(s) 622. Bus 612 can be implemented with any architecture designed for passing data and/or control information between processors (such as microprocessors, communications and network processors, etc.), system memory, peripheral devices, and any other hardware components within a system. For example, bus 612 can be implemented with one or more buses.

Memory 616 and persistent storage 618 are computer readable storage media. In the depicted embodiment, memory 616 includes random access memory (RAM) 624 and cache memory 626. In general, memory 616 can include any suitable volatile or non-volatile computer readable storage media. Instructions for the intent-based networking logic 160 may be stored in memory 616 or persistent storage 618 for execution by processor(s) 614.

One or more programs may be stored in persistent storage 618 for execution by one or more of the respective computer processors 614 via one or more memories of memory 616. The persistent storage 618 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 618 may also be removable. For example, a removable hard drive may be used for persistent storage 618. Other examples include optical and magnetic disks, thumb drives, and smart cards that are inserted into a drive for transfer onto another computer readable storage medium that is also part of persistent storage 618.

Communications unit 620, in these examples, provides for communications with other data processing systems or devices. In these examples, communications unit 620 includes one or more network interface units, such as network interface cards. Communications unit 620 may provide communications through the use of either or both physical and wireless communications links.

I/O interface(s) 622 allows for input and output of data with other devices that may be connected to computer device 600. For example, I/O interface 622 may provide a connection to external devices 628 such as a keyboard, keypad, a touch screen, and/or some other suitable input device. External devices 628 can also include portable computer readable storage media such as database systems, thumb drives, portable optical or magnetic disks, and memory cards.

Software and data used to practice embodiments can be stored on such portable computer readable storage media and can be loaded onto persistent storage 618 via I/O interface(s) 622. I/O interface(s) 622 may also connect to a display 630. Display 630 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, network devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the test module, the network device, the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to user identities or credentials). The database system may be included within or coupled to the server and/or client systems. The database systems and/or storage structures may be remote from or local to the computer or other processing systems, and may store any desired data (e.g., data relating to user authentication/authorization or credentials).

The present embodiments may employ any number of any type of user interface (e.g., Graphical User Interface (GUI), command-line, prompt, etc.) for obtaining or providing information (e.g., data relating to user authentication/authorization or credentials), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In summary, the techniques described herein provide for a network controller to automatically learn the intent of attached industrial devices based on a zero-touch deployment using network element integration via announcing the administrative shell (e.g., in an LLDP frame). The network controller derives network and security configurations based on the intent derived from the administrative shell. The network controller may provide network and security assurance monitoring based on correlating traffic profiles in the administrative shell with observed network behavior.

In one implementation, the techniques presented herein enable the use of Industry 4.0 device (e.g., IoT device) elements expressed through the device's Asset Administration Shell to automatically generate network configurations based on the translating the Asset Administration Shell into an intent for the device. The specific network configuration may include zoning overlay networks, and/or QoS requirements. Deriving the device intent automatically from the Asset Administration Shell removes the need for a network administrator to oversee the installation of each IoT object to address the expected network access and policy characteristics of the IoT device.

In one form, a method is provided for a network controller to automatically adjust a computer network based on the operational information of an industrial device. The method includes receiving a notification from a network element in the computer network that the industrial device attached to the network element has an administrative shell. The administrative shell includes operational information describing the operation of the industrial device. The method also includes retrieving the administrative shell from the industrial device. The method further includes parsing the operational information in the administrative shell to determine an intent for the industrial device, and adjusting the computer network based on the intent of the industrial device.

In another form, an apparatus comprising a network interface and a processor is provided. The network interface is configured to communicate with computing devices over a computer network. The processor is configured to receive a notification via the network interface form a network element in the computer network. The notification indicates that an industrial device attached to the network element has an administrative shell. The administrative shell includes operational information describing the operation of the industrial device. The processor is also configured to retrieve the administrative shell from the industrial device. The processor is further configured to parse the operational information in the administrative shell to determine an intent for the industrial device and adjust the computer network based on the intent of the industrial device.

In still another form a system comprising a network element and a network controller is provided. The network element is attached to an industrial device that has an administrative shell including operational information describing the operation of the industrial device. The network controller is configured to receive a notification from the network element indicating that the industrial device has the administrative shell. The network controller is also configured to retrieve the administrative shell from the industrial device. The network controller is also configured to parse the operational information in the administrative shell to determine an intent for the industrial device and adjust the computer network based on the intent of the industrial device.

In yet another form, a non-transitory computer readable storage media is provided that is encoded with instructions that, when executed by a processor of a network controller, cause the processor to automatically adjust a computer network based on the operational information of an industrial device. The instructions cause the processor to receive a notification from a network element in the computer network that the industrial device attached to the network element has an administrative shell. The administrative shell includes operational information describing the operation of the industrial device. The instructions also cause the processor to retrieve the administrative shell from the industrial device. The instructions further cause the processor to parse the operational information in the administrative shell to determine an intent for the industrial device, and adjust the computer network based on the intent of the industrial device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language, Python or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the presented embodiments.

Aspects of the present embodiments are described herein with reference to flowchart illustrations and/or block diagrams of methods, apparatus (systems), and computer program products according to presented embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various presented embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   at a network controller of a computer network, receiving a notification from a network element in the computer network, the notification indicating that an industrial device attached to the network element has an administrative shell, wherein the administrative shell includes operational information describing operation of the industrial device;
   retrieving a portion of the administrative shell from the industrial device, wherein the portion of the administrative shell is less than an entirety of the administrative shell and describes an amount of data the industrial device provides to a peer device and network tolerances for providing the data to the peer device;
   parsing the operational information in the administrative shell to determine an intent for the industrial device; and
   adjusting the computer network based on the intent of the industrial device to enable the industrial device to provide the amount of data to the peer device within the network tolerances specified in the portion of the administrative shell.

2. The method of claim 1, wherein adjusting the computer network comprises one or more of: assigning a network Quality of Service (QoS) for traffic associated with the industrial device, applying one or more Service Level Agreements (SLAs) to traffic associated with the industrial device, controlling network access and segmentation for the industrial device, configuring Access Control Lists (ACLs), configuring firewalls, or providing precise time synchronization to the industrial device.

3. The method of claim 1, further comprising:
   monitoring a network performance of the industrial device; and
   readjusting the computer network based on the network performance of the industrial device.

4. The method of claim 1, wherein the intent for the industrial device defines minimum requirements of network access to the computer network for the industrial device.

5. The method of claim 1, wherein the administrative shell is an Asset Administrative Shell (AAS) formatted according to an Industry 4.0 standard.

6. The method of claim 1, wherein the network element is notified of the industrial device by a Link Layer Discovery Protocol (LLDP) frame with a Type-Length-Value (TLV) structure indicating that the industrial device has the administrative shell.

7. An apparatus comprising:
   a network interface configured to communicate with computing devices over a computer network; and
   a processor configured to:
      receive a notification via the network interface from a network element in the computer network, the notification indicating that an industrial device attached to the network element has an administrative shell, wherein the administrative shell includes operational information describing operation of the industrial device;
      retrieve a portion of the administrative shell from the industrial device, wherein the portion of the administrative shell is less than an entirety of the administrative shell and describes an amount of data the industrial device provides to a peer device and network tolerances for providing the data to the peer device;
      parse the operational information in the administrative shell to determine an intent for the industrial device; and
      adjust the computer network based on the intent of the industrial device to enable the industrial device to provide the amount of data to the peer device within the network tolerances specified in the portion of the administrative shell.

8. The apparatus of claim 7, wherein the processor is configured to adjust the computer network by one or more of: assigning a network Quality of Service (QoS) for traffic associated with the industrial device, applying one or more Service Level Agreements (SLAs) to traffic associated with the industrial device, controlling network access and segmentation for the industrial device, configuring Access Control Lists (ACLs), configuring firewalls, or providing precise time synchronization to the industrial device.

9. The apparatus of claim 7, wherein the processor is further configured to:
   monitor a network performance of the industrial device; and
   readjust the computer network based on the network performance of the industrial device.

10. The apparatus of claim 7, wherein the processor is configured to parse the operational information and determine the intent for the industrial device to define minimum requirements of network access to the computer network for the industrial device.

11. The apparatus of claim 7, wherein the administrative shell is an Asset Administrative Shell (AAS) formatted according to an Industry 4.0 standard.

12. The apparatus of claim 7, wherein the notification from the network element is based on the network element receiving a Link Layer Discovery Protocol (LLDP) frame from the industrial device, the LLDP frame including a Type-Length-Value (TLV) structure indicating that the industrial device has the administrative shell.

13. A system comprising:
   a network element of a computer network, the network element attached to an industrial device that has an administrative shell including operational information describing operation of the industrial device; and
   a network controller of the computer network, the network controller configured to:
      receive a notification from the network element, the notification indicating that the industrial device attached to the network element has the administrative shell;
      retrieve a portion of the administrative shell from the industrial device, wherein the portion of the administrative shell is less than an entirety of the administrative shell and describes an amount of data the industrial device provides to a peer device and network tolerances for providing the data to the peer device;

parse the operational information in the administrative shell to determine an intent for the industrial device; and adjust the computer network based on the intent of the industrial device to enable the industrial device to provide the amount of data to the peer device within the network tolerances specified in the portion of the administrative shell.

14. The system of claim 13, wherein the network controller is configured to adjust the computer network by one or more of: assigning a network Quality of Service (QoS) for traffic associated with the industrial device, applying one or more Service Level Agreements (SLAs) to traffic associated with the industrial device, controlling network access and segmentation for the industrial device, configuring Access Control Lists (ACLs), configuring firewalls, or providing precise time synchronization to the industrial device.

15. The system of claim 13, wherein the network controller is further configured to:

monitor a network performance of the industrial device; and readjust the computer network based on the network performance of the industrial device.

16. The system of claim 13, wherein the intent for the industrial device defines minimum requirements of network access to the computer network for the industrial device.

17. The system of claim 13, wherein the administrative shell is an Asset Administrative Shell (AAS) formatted according to an Industry 4.0 standard.

18. The system of claim 13, wherein the network element is configured to receive a Link Layer Discovery Protocol (LLDP) frame with a Type-Length-Value (TLV) structure indicating that the industrial device has the administrative shell.

19. The system of claim 18, wherein the LLDP frame includes one or more additional TLV structures encoding at least a portion of the operational information.

20. The system of claim 18, wherein the LLDP frame is advertised on a secure connection between the industrial device and the network element.

* * * * *